United States Patent
Howard et al.

(10) Patent No.: US 6,353,886 B1
(45) Date of Patent: Mar. 5, 2002

(54) METHOD AND SYSTEM FOR SECURE NETWORK POLICY IMPLEMENTATION

(75) Inventors: Brett Howard, Nepean; Paul Kierstead, Ottawa; Gabor Solymar, Stittsville; Andrew Robison, Ottawa; Roy Pereira, Ottawa; Lucien Marcotte, Nepean, all of (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/198,609

(22) Filed: Nov. 24, 1998

(30) Foreign Application Priority Data

Feb. 4, 1998 (CA) .............................................. 2228687

(51) Int. Cl.[7] ................................................. G06F 1/26
(52) U.S. Cl. ...................... 713/156; 713/151; 713/153; 380/255
(58) Field of Search .......................... 380/255; 713/100, 713/150, 151, 153, 160, 200, 201, 156

(56) References Cited

U.S. PATENT DOCUMENTS

| | | | | | |
|---|---|---|---|---|---|
| 5,659,616 | A | * | 8/1997 | Sudia | 705/76 |
| 5,892,904 | A | * | 4/1999 | Atkinson et al. | 713/201 |
| 6,202,157 | B1 | * | 3/2001 | Brownlie et al. | 713/201 |

OTHER PUBLICATIONS

ITU–T, X.500 The Directory: Overview of concepts, models and services, Aug. 1997, ITU*
ITU–T, X.509 The Directory: Authentication framework, models and services, Aug. 1997, ITU.*

* cited by examiner

Primary Examiner—Thomas R. Peeso
(74) Attorney, Agent, or Firm—Blake, Cassels & Graydon LLP

(57) ABSTRACT

A method and system for implementing network policy is described. The method involves storing policy data using certificates using a certificate database server. Upon retrieval, a policy is then validated as properly certified prior to use. When a policy is not validated, it indicates tampering or improper policy data entry. When policy data is successfully validated, the policy is implemented.

27 Claims, 5 Drawing Sheets

METHOD AND SYSTEM FOR SECURE NETWORK POLICY IMPLEMENTATION

This application claims priority from previously filed Canadian application serial number 2,228,687 filed on Feb. 4, 1998.

FIELD OF THE INVENTION

This invention relates generally to communications networks and more particularly to a secured virtual private network (SVPN).

BACKGROUND OF THE INVENTION

In general form, computer networks are composed of a set of resource entities such as servers, printers, gateways, modems, etc.; a set of requestor entities such as users, user groups, and programs that access resources to retrieve data or manage resources; and means of communicating between the two sets of entities including, for example the network itself, routers, protocols, etc. Network nodes often belong to more than one of the above sets. The relationship between the resource entity set and the requestor entity set is often subject to a set of rules hereinafter referred to as "network policies." Network policies also comprise, for example, information regarding behavior of resources.

Network security data is a very common form of network policy data. Network security data may be considered as a collection of data records stored in an electronic medium. Records may contain any data item regarding requestors, resources, or the relationship therebetween. Examples of such records include: access rights, logging of successful or unsuccessful access to a device, billing of usage to a user's cost center, user password expiration date, restriction of access to certain hours, restriction of access to users physically located within a building, device status information, time related routing information, and so forth.

Network entities may query the policy database and determine actions to conform to the policy. For example, Windows 95® allows a user to disable or enable dial-up access. Depending on the configuration settings—policies—dial-up access is permitted or restricted. Also, user identities may be verified by information in the policy database. This data commonly relates to access codes or passwords. Users may create or receive access keys allowing them access to a predetermined set of resources. Many implementations exist for this conceptual policy database. Examples of such arrangements are Windows NT® domain administration system and Unix® Network Information Service (NIS). Those systems however, suffer an inherent weakness: if the policy database is compromised, the network security as a whole is compromised. Therefore, common practice restricts policy database modifications to local or highly secure access only. The benefits of a secure policy database having remote administration capabilities are obvious. Also, a more flexible policy implementation system would be beneficial. Generally policies are stored and implemented local to a single system. Referring to the example of the Windows 95® operating system, all policies are executed local to the system such that access is permitted or denied on the one computer system and storage media and peripherals connected thereto. This type of architecture increases system security, often at the expense of flexibility.

Connecting geographically separate computer systems or networks together is a common business need. Often the best interface for such a connection is for the remote system or network to appear as if it were on the local network. In many cases the most cost-effective medium for connecting remote systems is a public network such as the Internet, public switched telephone networks or other common carrier data networks. A common method for providing a network-like connection using a public network is known as Virtual Private Network (VPN). Basically, a VPN provides a means of transparent communication through a public network. This results in remote workstations and/or remote sections of the network appearing physically connected to the network through dedicated communication cables. Users using workstations at different physical locations separated by the public network are often provided with little indication of the public network—to them, the public network is merely another "cable."

In many cases VPNs compromise data security and integrity by exposing network communications and networks involved to unauthorized intrusion. In order to increase security the Internet Engineering Task Force (IETF) has developed the IPSEC standard. IPSEC is an extension to TCP/IP that utilizes data encryption methods and digital certificates mechanisms to positively verify an identity of a user or a workstation. While the IPSEC is specific to the TCP/IP protocol suite, the certificates, encryption mechanisms and general principles stipulated in IPSEC are also applicable to other computer communication networks. Implementation of IPSEC results in a Secure Virtual Private Network or SVPN.

The common implementation of a secured VPN calls for a security gateway to be placed at the interface point between the secured network and the public, unsecured network. Data and access rights on the secured side of the security gateway are controlled using conventional network access control methods while data flow to and from the unsecured network is encrypted and controlled by the gateway. Data is permitted to flow between the secured and unsecured networks according to network policies.

Part of the IETF development relies on digital certificates. A digital certificate is a method that binds an identity to a public key and optionally added information. Certification occurs in conjunction with a certificate authority (CA), a computer system trusted and capable of tagging the original sender public key for later verification. For example, the key is encrypted using a private key of the CA and using its associated public key, the data is decrypted. This verifies that the data was encoded by the CA. Certificates and certificate authorities are well known in the art, one method of which has been codified in international standard X.509 (ITU 1993, ISO/IEC 9594-8). For the purpose of this document the deposition of information to create a digital certificate is referred to as certification and verification that certified data was certified by the trusted CA is referred to as verification or authentication.

Unfortunately, many commonly available network policy features are not available using SVPN's. Also, flexibility is often compromised to ensure security and vice versa. For example, when a single network administrator or group cannot securely administer an entire network due to network complexity, network administration is decentralized and the weakest network security becomes the level of security for the network; when the network has many sub-networks all joined through the internet, this often results in either a low level of security or very little flexibility.

It would be advantageous to provide a high degree of flexibility, and a broad range of network features, while maintaining high level of security in a VPN environment.

SUMMARY OF THE INVENTION

The current invention seeks to increase flexibility in configuration of a network, a VPN or a SVPN while providing very high security levels. The invention achieves that goal by utilizing digital certificates for storage and transport of network policies.

While certificates are well known for identification and authentication of a user identity, the invention utilizes certificates to store policy related data, and thus implements a network policy system using digital certificates. These certificates are referred to as attribute certificates. Attribute certificates certifies data or attributes instead of a public key. By using an attribute certificate containing similar policy data the invention allows each valid policy data record to be verified as coming from an authorized network manager, and thus valid for implementation on the network. This prevents insertion of fake policy records into the database and thus significantly increases network security. Additionally, the association of policy records with persons authorized to issue those records, (i.e. network managers) is guaranteed by the Certificate Authority (CA) when desired. This allows secure network policy management to be conducted from remote sites. Storing the policy in a central database allows the network manager to easily change the policy, and have changes take effect immediately over the whole network.

In accordance with the invention, there is provided a method for implementing computer-networking security in a computer network having at least one secured network coupled with an unsecured network via a security gateway, at least one requestor connected to said unsecured network and at least one resource connected to the secured computer network, the method comprising the steps of: retrieving from a digital storage medium network security information, the network security information associated with a digital certificate; determining authenticity of the digital certificate; and, performing actions to conform with the network security information associated with the digital certificates when said certificate is authenticated.

These methods allow for significantly increased flexibility especially when applied to SVPN's. Since the policy information is certified it may be transferred over non-secured networks without significantly impacting network security. Thus secured remote configuration of networks, easy subnet operations, and even remote configuration of individual workstations residing in or out of a secured network is made possible.

BRIEF DESCRIPTION OF THE DRAWINGS

An exemplary embodiment of the invention will now be described in conjunction with the attached drawings, in which.

DESCRIPTION OF THE PREFERRED EMBODIMENT

Commonly when a user logs into a network, the user is provided access to the network according to established rules. For users physically located within a secure environment, these access restrictions prevent general dissemination of sensitive information to users of the network. For example, access to human resource data is often restricted to people involved with the particular files. For users physically located outside the secure environment, these access restrictions are implemented in part to prevent hacking—illegal access—from presenting a significant threat to data integrity and security.

Figure 1:
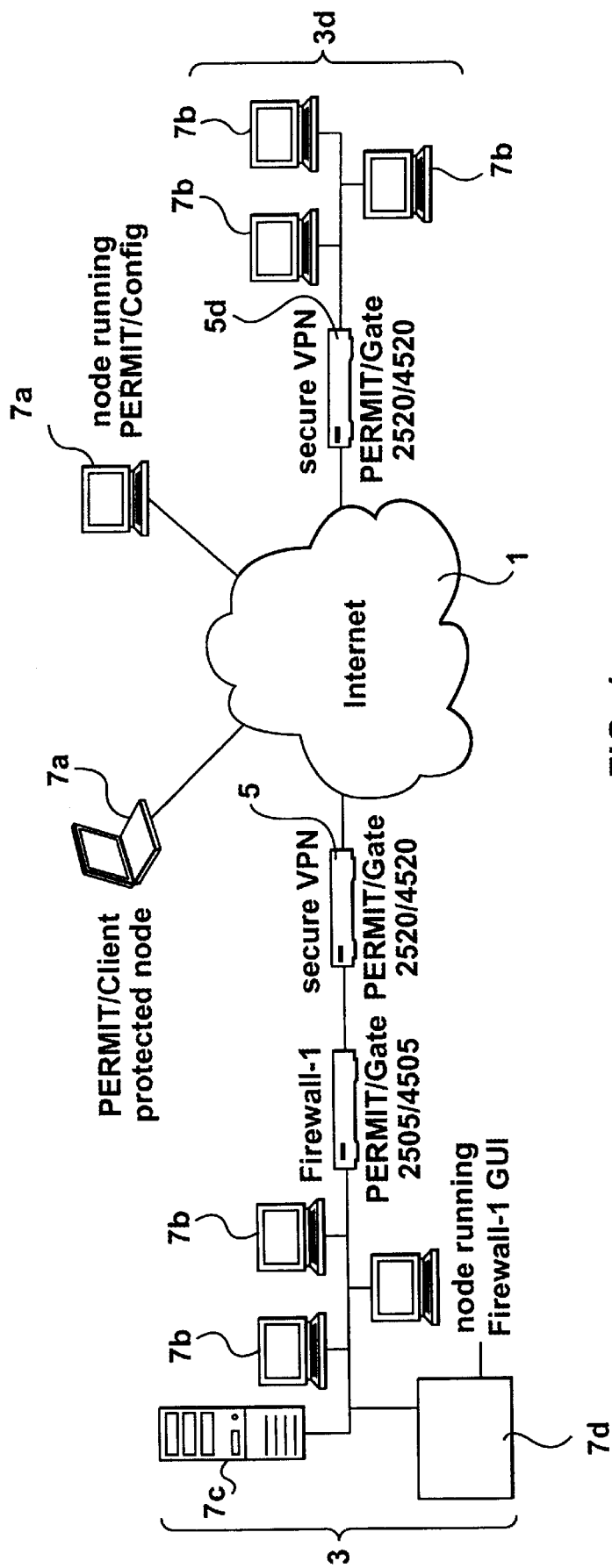
FIG. 1 is a block diagram showing a common communication scheme according to the prior art.

Referring to FIG. 1, a secured virtual private network (SVPN) is shown. An unsecured communication medium 1 in the form of the Internet forms a communication backbone for the network and allows for communication between different geographical locations. A variety of unsecured and secured systems (not shown) are in communication with the unsecured communication medium 1. The SVPN operates across the unsecured communication medium 1 providing secure communication through the unsecured communication medium 1 and transparent network operations. A secured network 3 is separated from the unsecured communication medium by a gateway 5. The gateway 5 acts to secure communications with other gateways and with workstations 7a provided with appropriate software. Workstations 7b located within secured network 3 communicate with resources, servers, and other workstations forming part of the secured network 3 absent gateway security. The secured network 3 also comprises a file server 7c and peripheral devices 7d.

Figure 2:
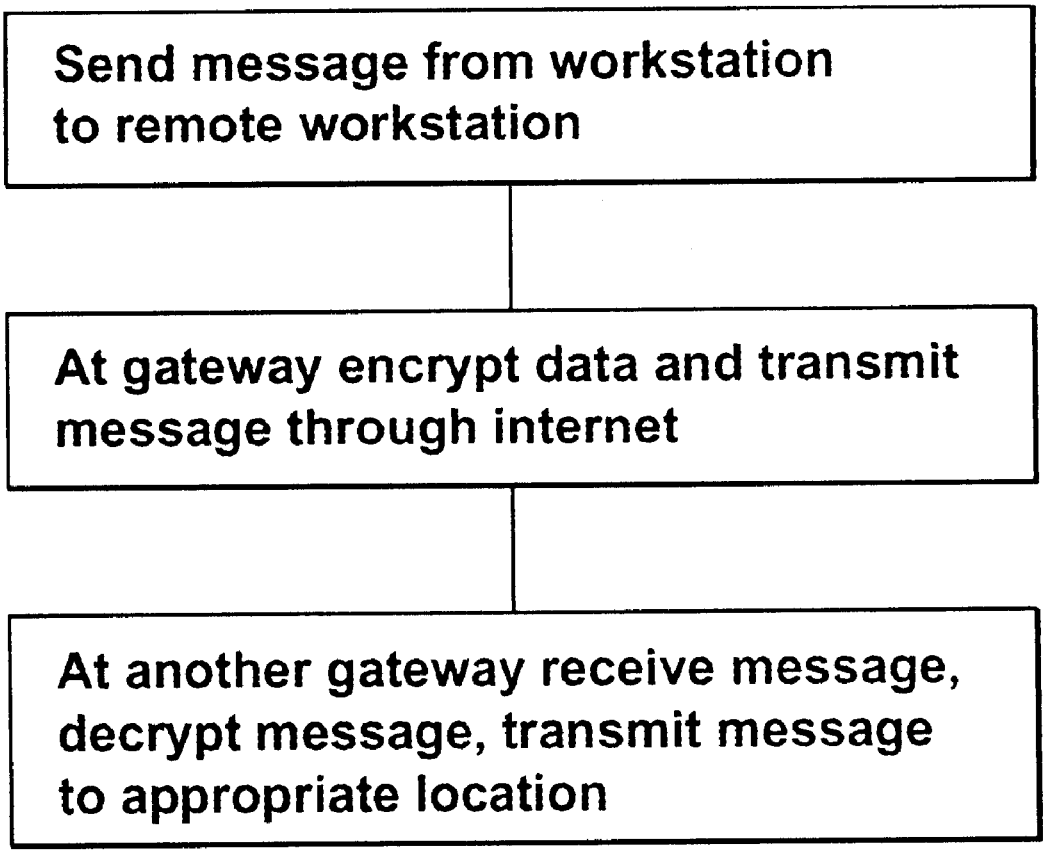
FIG. 2 is a simplified flow diagram of a method of providing a secure virtual private network according to the prior art.

Referring to FIG. 2, a simplified flow diagram of a method according to the prior art of communicating between workstations on different secured network segments is shown. When a message from a workstation 7b to another workstation separated from the workstation 7b by the unsecured communication medium 1 is sent, the message is packaged according to the secured network protocol and transmitted via the secured network 3. When the message is received by the gateway 5, it is secured and packaged for transmission over the unsecured communication medium 1 in the form of the Internet. Preparation of information for secure transmission via the Internet is well known. For example, the IPSEC specifications provide sufficient reference for implementation of a secure communication channel using the Internet as a communication medium. The secured message with unsecured Internet protocol and address information is then transmitted via the Internet to a destination gateway 5d forming part of a second secured network 3d. The destination gateway 5d receives the message and extracts it from the Internet protocol and address information and then extracts the message from the secured message. The resulting unsecured message has network information and addressing information for the destination secured network 3d. When the receiving gateway forms part of a second network using a different network communication protocol, the gateway or a communication server translates the message to an appropriate format for the receiving network 3d. The message is then transmitted via the second secured network 3d to the destination workstation. Using the method of FIG. 2, secure communication between two workstations separated by the unsecured communication medium 1 is transparent to a user.

A method of encryption involves the use of key-pairs—one private and the other publicly available. Commonly, publicly available keys are stored in a key database. For this purpose, an X.500 database may be used in cooperation with a trusted certificate authority. The certificate authority provides for certificate creation and certificate distribution. When desired, the certificate authority also provides for authorisation of data provided to the CA prior to certification. The database provides for certificate storage and allows for storage of a sufficient number of certificates. Of course, as a network grows, larger certificate databases or, alternatively, a plurality of different certificate databases are used. A server provides network communications for the certificate authority and the database. Certificate authentication and retrieval is a process initiated by gateways since it relates to secure communication via the unsecured communication medium.

Authentication of encryption keys using certification is well known. For example, a secured certificate is transferred to a destination system for authentication. Once authenticated as a valid certificate, communication is initiated. The communication is thereby verified as between two valid systems providing an authenticated certificate. When the certificate contains data, the data is usable once the certificate is authenticated because the data is then known to accurately reflect data within the certificate database. When used with encryption keys, this ensures use of correct encryption keys and prevents transmission of information— even encrypted information—to incorrect destinations or with incorrect security precautions.

Figure 3:
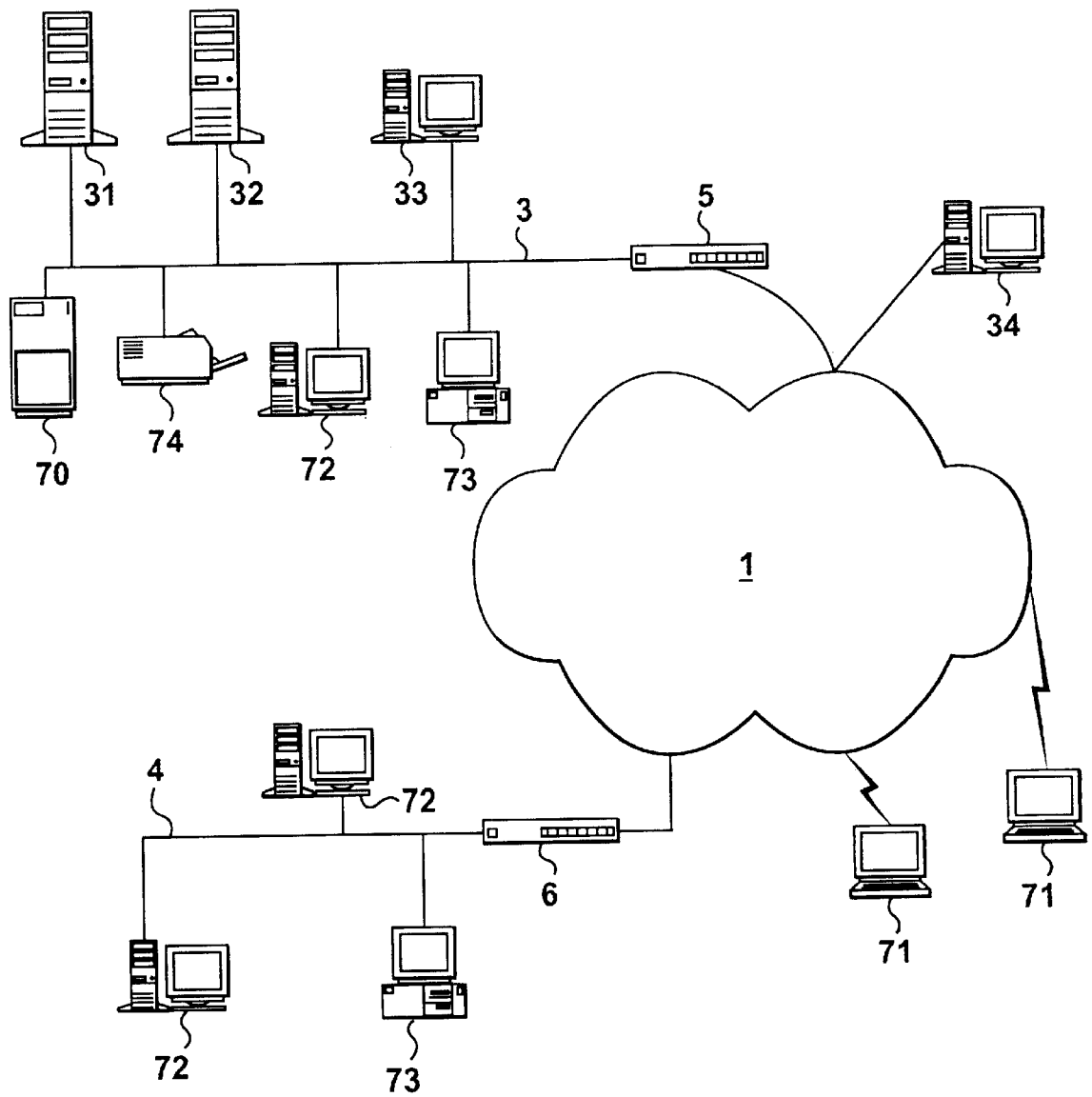
FIG. 3 is a block diagram depicting a common communication scheme for practicing the invention.

In FIG. 3 a block diagram depicts a typical implementation of an SVPN according to the invention. The secured network 3 is connected to any number of computer systems 70, servers 72, workstations 73 and other network resources 74. The secured network 3 is separated from unsecured network 1 by a security gateway 5. A second secured network 4 is also connected to the unsecured network 1 via a second security gateway 6. Any number of workstations may connect to secured networks 3 and 4 via the unsecured network 1. Communications flow via the security gateways 5 and 6 respectively.

A policy database 32 is used to store policy records in the form of certificates. The policy database resides in an X.500 conformant database management system capable of storing certificates and retrieving those certificates in response to queries. Commonly available X.500 conformant key servers are well suited for this purpose. It should be noted however that many other database management systems are suitable for this purpose. Optionally, more than a single policy database exists on a segment of the network or on more than one segment of the network. A certificate authority (CA) 33 is shown connected to the secure network 3. Another certificate authority (CA) 34 is shown connected outside the perimeter of the secured network 3. While only one CA is needed two are shown in order to demonstrate the principle that a CA may be connected inside or outside the secured network 3, 4 perimeter. This also demonstrates that more than one CA may be used with the invention. Below, reference is made to CA 33 though CA 34 may be used in conjunction with or in place of, CA 33.

Figure 4:
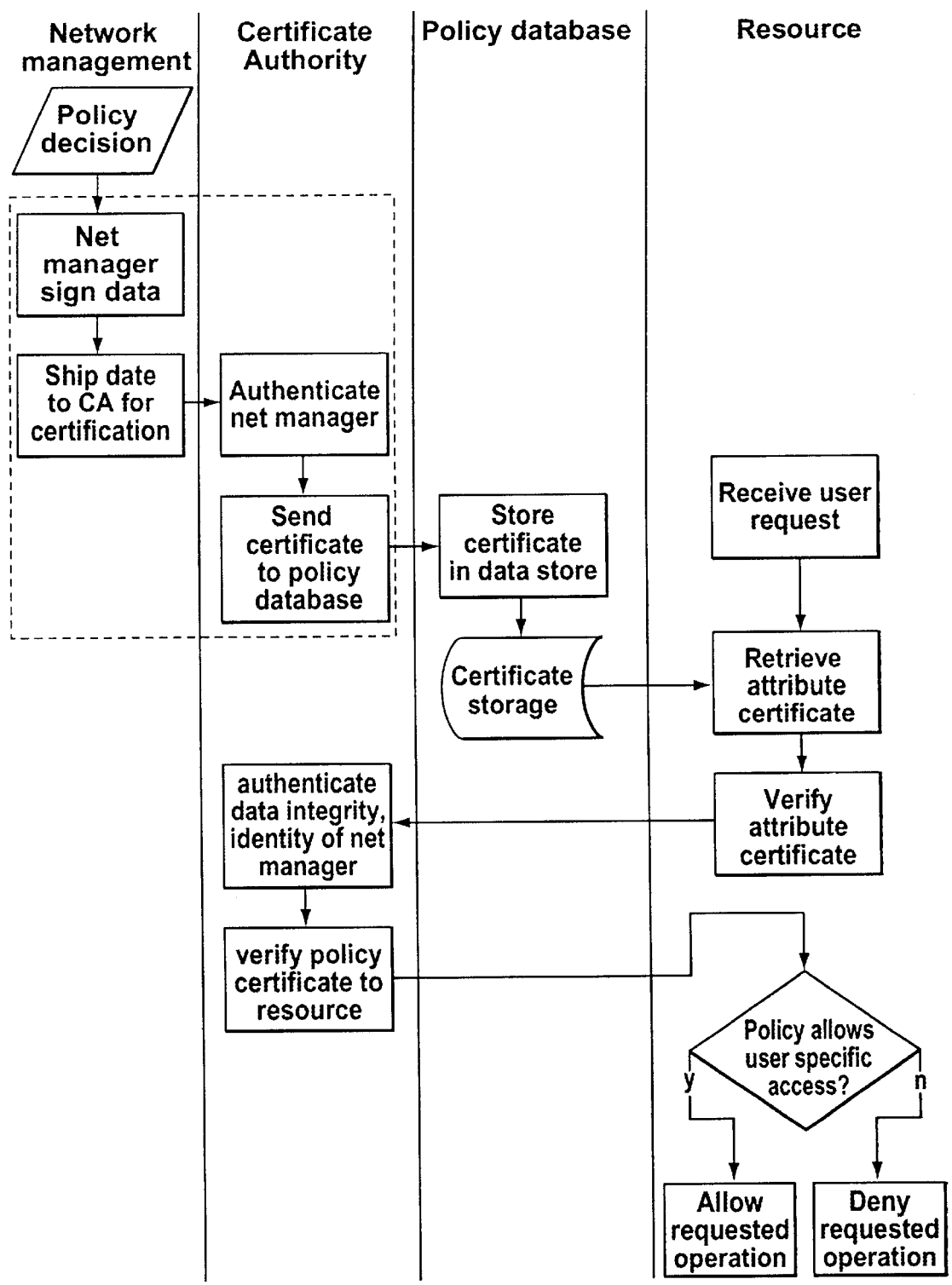
FIG. 4 depicts a simplified data flow diagram between network manager, certificate authority, policy database and a network resource.

When a network manager, any person or program authorized to dictate network policies, creates an operative association between users and resources using a network director system or sub-routine, the network manager creates a digitally signed policy record and ships the record to the certificate authority 33 for certification as depicted in FIG. 4. Of course, in accordance with an implementation indicated by the dashed lines, the network director comprises the CA 33. The certificate authority, in accordance with common certification operations such as those defined in X.509, creates a certificate. By nature of the data it carries, the certificate is an attribute certificate. The attribute certificate is stored in the policy database 32.

When a resource needs to retrieve policy information, the resource requests one or more relevant attribute certificates from the policy database 32 and using an authentication method, authenticates the received attribute certificate. Authentication of certificates is well known in the art of computer security. If the authenticity of the attribute certificate is verified, the policy embedded within or indicated by the certificate is carried out. If the certificate is not verified, the indicated or embedded policy is not carried out. In cases where the certificate is not verified, the resource attempts to retrieve other attribute certificates containing further policy information. For example, certificates relating to non-verified events are retrieved to determine network policy for recording "bad" certificates, notifying administrators regarding the failed verification, and possibly to determine default programmed behavior. Examples of security policies include: allow access of a user, group, or everyone to a resource; deny access to a resource, hours of availability of a resource or network; security level for communications; maintain an access log for the resource or for the transactions; copy the administrator on the transaction details; require password; and terminate user connection. Other forms of policies such as bill resource usage are also supported by the present invention.

Since the security gateways 5 and 6 are also resources on the network, policies implemented regarding the gateways allow for very flexible network configuration to occur. For example, a gateway may allow access to a certain set of resources while hiding others from a user or group, thus creating a subnet. All that is required for such an operation is the creation, certification and storage of attribute certificates that restrict visibility of certain network resources to certain users. For instance, when a user attempts to communicate with the server 72, the gateway retrieves from the policy database 32 an attribute certificate associating visibility of server 72 to that user. The gateway then verifies the attribute certificate. If the certificate is verified as correct, the content embedded in it is examined and when the server 72 is to be visible to the user, the communications are forwarded to the sever 72. Otherwise an error message is sent to the user similar to an error message one receives when one requests a resource that is not present. As mentioned before, optionally unauthorized access attempts are logged or result in alarm conditions.

Figure 5:
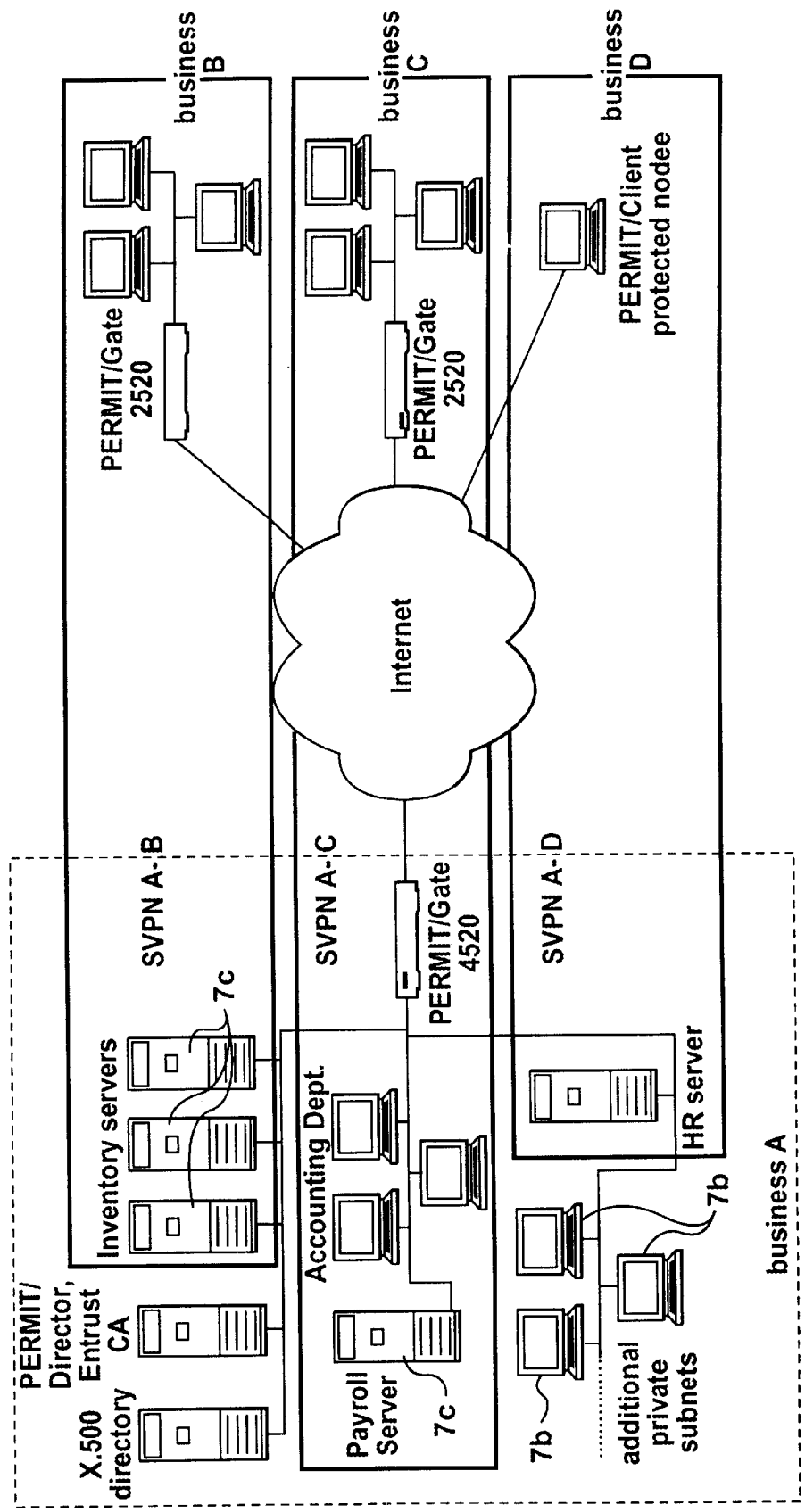
FIG. 5 is a block diagram of a plurality of networks having overlapping resources and each having restricted visibility of resources on other networks.

Referring to FIG. 5, business A hires 3 other companies to help with administration and other work in specific areas of the company. Business B is hired to work on analysis and maintenance of the company's inventory. Inventory servers are accessible to business B. This ensures timely and efficient work. Unfortunately, much of the company's information is sensitive and it is not desired that business B have access to that information. Presently, for example, business B employees would consult with business A on-site and would therefore have access to the entire network though some areas are password protected. According to the present invention, policies are created, certified, and stored permitting the network of business B to access the inventory systems on the secured network of business A. By restricting visibility of other systems, security is maintained without significantly affecting contractor performance.

Similarly, business C, which helps out with accounting, is provided access to the accounting department systems. Business C has no access to, nor can a workstation on the network of business C see other systems within the secured network of business A. Business D helps out with human resources.

Each contracting company business B, business C, and business D, view their network as including some servers from the secured network of business A; however, their networks are unaware of the network of business A—its presence or its contents.

The invention also provides for policy decisions to be acted upon by workstations outside the secured network perimeter. A workstation connected to an unsecured network 1 may receive attribute certificates notifying it to change its own attributes such as encryption key, encryption algorithm, security level, internal tunneling IP address for use by the workstation, setting an additional network address resolver (DNS server), and so forth. The attribute certificate containing this notification is verified. Of course, it is possible to have the user of such a workstation initiate retrieval of attribute certificates.

In the preferred implementation each user is issued a user certificate to verify user identity to various network resources or to a central logon authority; however, any method of user verification may be used without detracting from the security afforded to network management by the invention. A user certificate allows a user to connect to the network and enjoy access and other privileges from a remote location as long as an unblocked communication path is established with the secured network.

Optionally, the policy database is replicated and scaled using well-known database management practices; this is often straightforward because the database is managed by a common database management system. Similarly, a plurality of certificate authorities may be used. This allows the invention to scale to a large number of managed nodes, resources, networks or geographical locations. It also allows for use of different types of secured and unsecured networks.

Essentially, because of the flexibility of storing policies in a database, a flexible policy implementation system is possible. Policies are defined for individual users, groups, default situations and so forth and may be further defined in any desired fashion. Since a policy is retrieved based on a user-resource pairing, individual configurability and flexibility is maximized. Simultaneously, the use of certification provides security such that each node in the pair is certain of policy authenticity as are nodes therebetween.

Cooperative implementation of network policies improves network flexibility and security. For example, when a breach in network security occurs, modification of security algorithms and encryption keys is performed by modifying policies and keys stored within certificates. In order to do so, the new policies and keys must be re-certified. These are retrieved and implemented cooperatively. Since the certificates are certified, it is difficult to alter user access privileges or security algorithms absent authorization. It is evident to those of skill in the art that such an implementation of certified policies is advantageous.

Also, there are significant benefits to flexible policy implementation once network security is ensured. In the past, network security was often compromised by additional flexibility in policy management and implementation. According to the present invention, flexibility is significantly increased without significant impact on flexibility since each policy is certified. Absent said certification, it is possible to insert unauthorized policies, which are then implemented. Some of the unauthorized policies could be very damaging. The use of certification limits the ability of users to falsely create network policies.

A further example of application of the present invention relates to travelling employees. It is often desirable that security levels are increased while travelling in certain predetermined countries. For this reason it would be beneficial to ensure a flexible security level. For users who travel, an indication of their location is determined and, based on verified policies, a security level and algorithm are selected. For example, when direct dial-up connections are used, a low level of security is implemented; using a public network within the United States a mid-level security method is employed, in friendly countries such as Canada, an upper-middle security level is implemented, and in other countries such as Iraq, a high level of security is implemented. Of course when an algorithm is determinative of the security level, only an algorithm or a security level is selected. Thus, each time the user accesses the network, a certified policy is provided to the user, and a security level is determined in some fashion. The security is implemented on both the gateway and the user's system. The resulting flexibility is advantageous and security is maintained because the user's system validates the policy information prior to implementation and therefore knows that it is not tampered with.

Since overseas data communications are monitored in several countries, implementation of a secure flexible security system is advantageous. It prevents tampering through listening, decoding, or through provision of false configuration data to a mobile workstation. Of course, for portable computers connecting remotely to a network gateway, many other advantages exist to the method of the present invention.

Numerous other embodiments are envisioned without departing from the spirit or scope of the invention.

What is claimed is:

1. A method of providing computer network security between a secured network communicating with a requestor via an unsecured connection, said secured network comprising a resource sought by said requestor, said method comprising:
   a) in said secured network, retrieving security information relating to communication rights between said requestor and said resource;
   b) in said secured network, verifying said security information to determine authenticity of said security information; and
   c) upon positive authentication of said security information, said security information indicating a permitted communication between said requestor and said resource, allowing communications to be sent between said requestor and said resource.

2. The method of claim 1, wherein said step of verifying said security information comprises analysing a digital certificate to determine authenticity of said security information.

3. The method of claim 2 wherein said communications sent between said requestor and said resource are provided via a security gateway associated with said secured network.

4. The method of claim 3 wherein said requestor forms part of a second, other secured computer network.

5. The method of claim 3 wherein said security information includes policy information relating to implementation of network security.

6. The method of claim 5 wherein the network security information includes at least one of access privilege information, security configuration information, communication configuration information, and access monitoring and logging configuration information.

7. The method of claim 1, wherein said step of verifying said security information comprises determining a security level of said requestor by analyzing a type of connection associated with said requester.

8. The method of claim 1, wherein said step of verifying said security information comprises determining a security level of said requestor by analyzing a geographic location associated with said requestor.

9. A method for implementing computer-network security in a computer network having at least one secured network comprising a requestor and a resource, the method comprising the steps of:
   a) retrieving form a digital storage medium to said resource, certified network security information other than an encryption key, the certified network security information certified with a digital certificate and associated with at least one of the requestor and the resource;
   b) performing verification analysis by said resource on the digital certificate to determine authenticity of the certified network security information; and
   c) configuring security for each of the requester and the resource according to the certified network security information when the certified network security information is determined to be authentic.

10. The method for implementing computer-networking security as defined in claim 9, wherein the certified network security information is certified and stored within the digital certificate.

11. The method for implementing computer-networking security as defined in claim 10, comprising the steps of: certifying the certified network security information; and storing the certified network security information within the associated digital certificate.

12. The method for implementing computer-networking security as defined in claim 11, comprising the step of storing the digital certificate in a network accessible database.

13. The method for implementing computer-networking security as defined in claim 12 wherein the network accessible database is an X.500 compliant certificate database.

14. The method for implementing computer-networking security as defined in claim 9 comprising the step of:
   d) when the authenticity is not successfully determined performing one of, determining and storing information relating to the unsuccessful determination of authenticity and generating an alarm condition.

15. The method for implementing computer-networking security as defined in claim 9, wherein the step of determining authenticity comprises the steps of:
   determining a certificate authority that created the digital certificate;
   determining an encryption key associated with the certificate authority;
   decrypting the digital certificate using the determined key; and
   verifying that the certificate is authentic.

16. The method for implementing computer-networking security as defined in claim 15, comprising the step of, when analysis fails to authenticate the certificate, generating an alarm condition.

17. The method for implementing computer-networking security as defined in claim 9, wherein the network security information also comprises user identity information to validate the identity of a network user and resource identity information to validate the identity of a network resource.

18. The method for implementing computer-networking security as defined in claim 9, wherein the said network security information also comprises visibility information to operatively associate resources existence acknowledgement with specific requestor.

19. A method for disseminating network security information to a remote workstation forming part of a secure network, the workstation capable of modifying its configuration parameters in response to configuration parameters received from the network, the method comprising the steps of:
   a) in said secure network, retrieving a digital certificate from a database;
   b) providing said digital certificate to said workstation;
   c) in said secure network, analysing said digital certificate to provide an authenticity result; and
   d) upon said authenticity result indicating said digital certificate is valid, modifying said workstation configuration parameters other than encryption keys used in communication, said modifying said workstation configuration parameters utilizing information in said digital certificate.

20. The method for disseminating network security information to a remote workstation as defined in claim 19, comprising the steps of:
   e) determining workstation configuration information;
   f) certifying the determined workstation configuration information to form a digital certificate; and,
   g) storing said digital certificate in the database forming part of the network.

21. A system for providing a secure network environment comprising:
   a) a certificate database for coupling to a network, the certificate database for storing digital certificates wherein some digital certificates include network policy data; and,
   b) a policy manager for creating and modifying network policy data, for providing the network policy data to a certificate authority for certification, and for providing the certified network policy data to the policy database for storage therein.

22. A method for implementing computer-networking security in a computer network having at least one secured network coupled with an unsecured network via a security gateway, at least one requestor connected to said unsecured network and at least one resource connected to said at least one secured network, the method comprising the steps of:
   a) retrieving network security information from an electronic storage medium for indicating communication rights between one of said at least one requestor and one of said at least one resource, the network security information digitally certified with a digital certificate and including at least one of access privilege information, security configuration information, communication configuration information, and access monitoring and logging configuration information;
   b) performing verification analysis on said digital certificate to determine authenticity of said network security information; and,
   c) allowing communications between said one of said at least one requestor and said one of said at least one resource if said network security information indicating a permitted communication is determined authentic, said communications provided via said security gateway.

23. A method for implementing computer-networking security in a computer network having at least one secured network comprising a requestor and a resource, the method comprising the steps of:
   a) retrieving from a digital storage medium certified network security information other than an encryption key, said certified network security information certified with a digital certificate and associated with at least one of said requestor and said resource, said certified network security information comprising visibility information to operatively associate existence acknowledgement of said resource with said requester;

b) performing verification analysis on said digital certificate to determine authenticity of said certified network security information;

c) configuring security for each of said requester and said resource according to said certified network security information when said certified network security information is determined to be authentic.

24. A computer-networking security system in a computer network having at least one secured network coupled with an unsecured network, at least one requestor connected to said unsecured network and at least one resource connected to said at least one secured network, said system comprising a security gateway associated with said at least one secured network and an electronic storage medium coupled to said computer network for storing network security information indicating communication rights between one of said at least one requestor and one of said at least one resource, wherein said security gateway performs the steps of:

a) retrieving said network security information from said electronic storage medium, said network security information digitally certified with a digital certificate;

b) performing verification analysis on said digital certificate to determine authenticity of said network security information; and, c) allowing communications between said one of said at least one requestor and said one of said at least one resource if said network security information indicating a permitted communication is determined authentic, said communications provided via said security gateway.

25. The computer-networking security system as claimed in claim 24, wherein said one of said at least one requestor forms part of a second other secured computer network.

26. The computer-networking security system as claimed in claim 24, wherein said network security information includes policy information relating to implementation of network security.

27. The computer-networking security system as claimed in claim 26, wherein said network security information includes at least one of access privilege information, security configuration information, communication configuration information, and access monitoring and logging configuration information.

* * * * *